United States Patent [19]

Budnik

[11] Patent Number: 6,092,650
[45] Date of Patent: Jul. 25, 2000

[54] COMPACT DISC HOLDER

[75] Inventor: Katharina Budnik, Stamford, Conn.

[73] Assignee: International Masters Publishers Inc., Stamford, Conn.

[21] Appl. No.: 09/348,590

[22] Filed: Jul. 6, 1999

[51] Int. Cl.[7] .................................................. B65D 85/57
[52] U.S. Cl. ........................ 206/232; 206/308.1; 206/310; 206/311
[58] Field of Search ................................ 206/232, 308.1, 206/311, 312, 313, 310, 387.13, 472

[56] References Cited

U.S. PATENT DOCUMENTS

| D. 271,161 | 11/1983 | Compton . | |
|---|---|---|---|
| 3,352,027 | 11/1967 | Schwartz . | |
| 3,866,751 | 2/1975 | Holert . | |
| 4,002,355 | 1/1977 | Sendor . | |
| 5,484,054 | 1/1996 | Kryszewski . | |
| 5,669,491 | 9/1997 | Pettey . | |
| 5,701,997 | 12/1997 | O'Brien et al. ...................... | 206/232 X |
| 5,743,390 | 4/1998 | Pozzoli . | |
| 5,769,217 | 6/1998 | Derraugh et al. . | |
| 5,839,575 | 11/1998 | Blanco .................................... | 206/232 |
| 5,857,565 | 1/1999 | Baker et al. . | |

Primary Examiner—Jacob K. Ackun
Attorney, Agent, or Firm—Cummings & Lockwood

[57] ABSTRACT

A booklet for housing a circular disc, such as audio compact disc or CD-ROM, is disclosed. The booklet has a front and back cover attached to and at least partially rotatable about a spine or hinge and movable between an open and closed position. At least one of the covers comprises a recessed portion. A compact disc holder tray is secured in the recessed portion of one of the covers. A central hub is formed integrally with the compact disc holder tray and has a top and a bottom; the diameter of the top of the hub is less than the diameter at the bottom of the hub, allowing the compact disc to fit over the top of the hub and to become frictionally engaged therewith. As such, the compact disc holder tray holds the compact disc in the booklet in a decorative fashion that allows the compact disc to be viewed when the booklet is in the open position. The booklet also comprises at least one page, and preferably a plurality of pages, attached inside the booklet and about the spine, for providing information to a user which relates to the information contained on the compact disc.

15 Claims, 3 Drawing Sheets

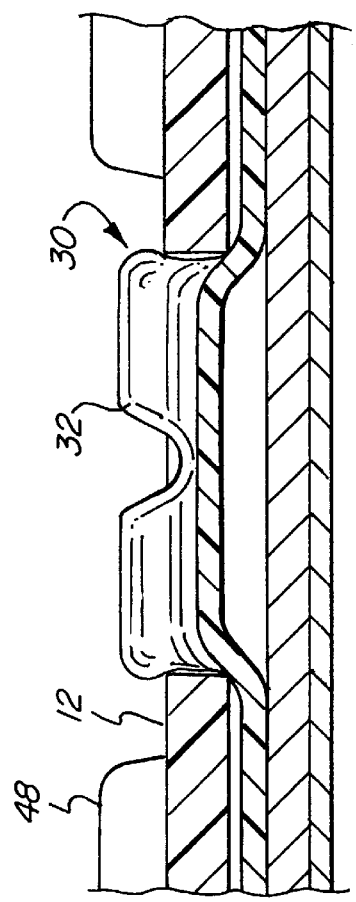
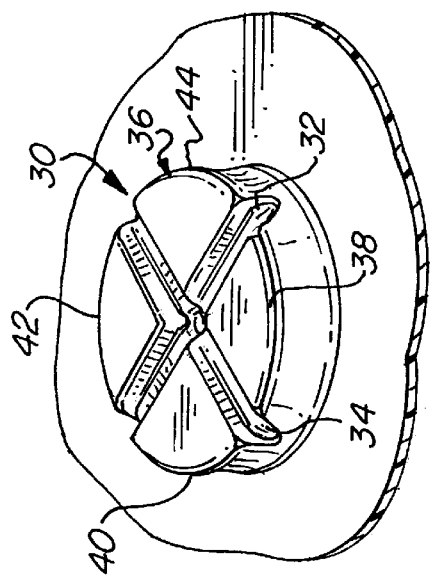
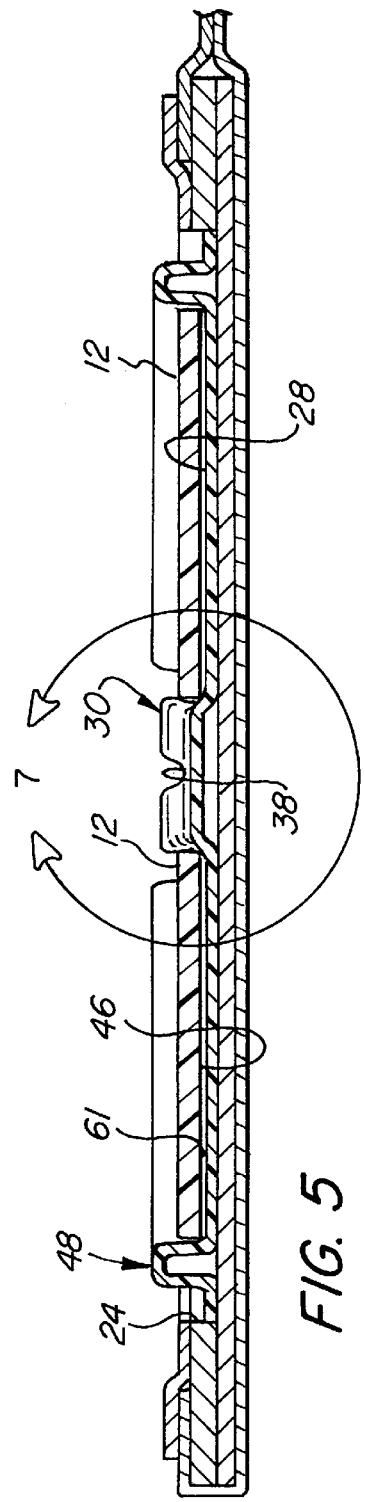

COMPACT DISC HOLDER

FIELD OF THE INVENTION

The present invention generally relates to containers for holding compact discs and, more particularly, to compact disc containers having printed information that accompanies the compact discs.

BACKGROUND OF THE INVENTION

Audio compact discs, for example, those containing prerecorded music, are typically stored in plastic containers known in the trade as "jewel boxes." Jewel boxes utilize front and rear plastic panels that are hinged together along adjacent edges. Although jewel boxes are an effective storage device for compact discs, they are prone to breakage when sent through the mail and are relatively bulky compared to the discs themselves.

The jewel boxes have additional disadvantages. Manufacturing costs for jewel boxes are relatively high. Jewel boxes are not easy to print on; typically, printed information accompanying the compact disc is enclosed in the box and positioned to show through it. The size of the jewel boxes limits the amount of printed matter that can accompany the compact disc. Small information booklets are either enclosed in them or held within a recess on the back. Removal and re-insertion of such booklets is awkward.

Several prior art patents attempt to overcome the disadvantages of the jewel box. For example, U.S. Pat. No. 5,669,491 to Pettey discloses a compact disc folder in the form of a booklet. The front panel of the cover has a pocket for holding a CD. A plurality of pages are attached to the spine of the booklet and adjacent to the CD pocket for displaying printed matter. The device shown by the '491 patent is disadvantageous, however, because it does not allow the user to see the CD, does not generate as much consumer appeal and therefore does not generate as much impulse buying.

U.S. Pat. No. 5,769,217 to Derraugh et al. discloses a compact disc holder having a tray for housing a CD. A transparent, plastic cover is hingedly connected to the tray to protect and cover the CD. This device is undesirable, however, because it is relatively expensive to manufacture, difficult to assemble, and relatively heavy and bulky to send through the mail.

U.S. Pat. No. 5,743,390 to Pozzoli discloses a container for housing two or more CDs. The container has two flat bottom surfaces that are arranged side by side, but at different levels from each other. The device taught by Pozzoli is disadvantageous, however, because it is rather complicated and expensive to manufacture, difficult to assemble and relatively heavy and bulky to send through the mail.

Central hubs for frictionally engaging and retaining a compact disc in the container are known. However, the central hubs of the prior art devices are disadvantageous because they do not sufficiently retain the CD in the container; thus, the CD sometimes becomes dislodged due to relatively little movement. Such containers are not suitable for sending CDs through the mail. Prior art hubs are disadvantageous also because they are relatively complicated and expensive to manufacture and sometimes cannot be made from the same mold that is used to make the tray. Other prior art CD containers require another element in addition to the hub to satisfactorily retain the CD in the container.

What is desired therefore is a container for housing a compact disc, which adequately protects the disc before and after purchase, which allows the CD to be viewed by the consumer, which has a central hub that is alone capable of retaining the CD in the container, and which is relatively inexpensive, simple and cost-effective to manufacture and easy to assemble.

SUMMARY OF THE DISCLOSURE

Accordingly, it is an object of the present invention to provide a container for holding a compact disc in a manner that protects the disc both before and after purchase.

It is another object of the present invention to provide a container for holding a compact disc that allows the compact disc to be viewed by the user.

It is still another object of the present invention to provide a container for holding a compact disc that has a central hub that sufficiently frictionally engages a center hole of the CD for retaining the CD in the container.

It is a further object of the present invention to provide a central hub that retains the compact disc in the container even when the CD may be subjected to relatively rough handling.

It is still another object of the present invention to provide a compact disc holder that is relatively inexpensive, simple and cost-effective to manufacture.

It is yet another object of the present invention to provide a container for holding a compact disc that is sturdy, light-weight and economical to send through the mail.

It is yet a further object of the present invent to provide a compact disc holder that is easy to assemble.

To overcome the disadvantages of the prior art and to achieve the objects and advantages set out above, Applicant discloses a container, or booklet, for housing a compact disc. The booklet comprises a front and back cover, joined about a spine, and movable between an open and closed position. The booklet also comprises a plurality of pages, positioned between the front and back covers and also rotatable about the spine, for providing information to a user that complements the information contained on the compact disc.

In the preferred embodiment, the front cover comprises a recessed portion therein for receiving a compact disc holder tray. The compact disc holder tray allows the compact disc to be housed in the booklet in a fashion that allows the compact disc to be viewed when the booklet is in the open position.

The compact disc holder tray comprises a bottom surface that lies in a plane and a substantially centrally-located, elevated hub formed integrally with the compact disc holder tray. The hub has at least one groove that extends at least partially across the hub's top portion. The groove has a depth such that the bottom of each groove resides in a plane positioned higher than the plane containing the bottom surface of the compact disc holder tray.

The hub has a top and a bottom. The top of the hub has a diameter that is less than the diameter of the bottom of the hub, allowing the hub to mate with the central aperture of the CD and releasably hold the compact disc in the booklet. The varying diameter of the hub allows the hub to accommodate CDs with apertures that have slightly different diameters.

The compact disc holder tray further comprises a lip positioned about the perimeter of the compact disc holder tray. The lip has a height greater the height of the compact disc when the compact disc is releasably positioned on the hub in the booklet. The lip and the inside cover of the booklet have complimentary cutout portions sized and shaped to allow a user to insert a digit under the compact disc so as to remove the compact disc from the compact disc holder tray, when the compact disc is releasably held in the booklet.

The design of the present invention allows the CD holder tray and its integral hub to be manufactured relatively easily and economically. The central hub with its unique design allows the booklet to be subjected to relatively rough handling while still effectively retaining the CD in the booklet.

BRIEF DESCRIPTION OF THE DRAWINGS

FIG. 5 is a cross-sectional view of the compact disc holder tray, taken along line 5—5 of FIG. 4;

FIG. 6 is an enlarged, isometric view of the booklet's central hub shown in FIG. 2; and FIG. 7 is an enlarged, localized cross-sectional view of the central hub of FIG. 5.

DETAILED DESCRIPTION OF THE DRAWINGS

Figure 1:
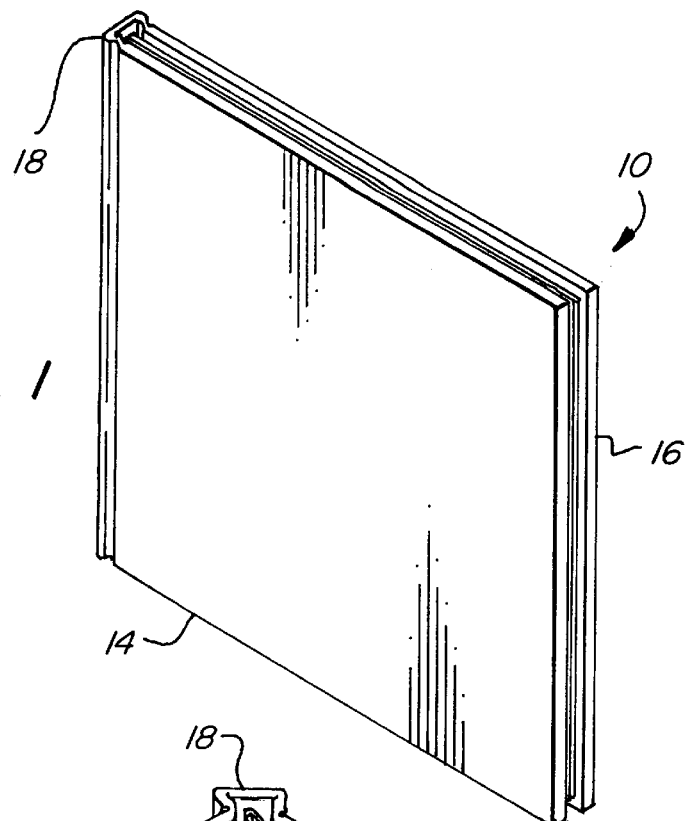
FIG. 1 is an isometric view of a compact disc holder booklet in the closed position, the booklet constructed in accordance with the present invention.

Referring to the drawings in detail, a container for housing a circular disc is shown and generally designated by the reference numeral 10. It should be noted that for the sake of clarity all the components and parts of container 10 may not be shown and/or marked in all the drawings. As used in this description, the terms "up", "down", "top", "bottom", etc. refer to container 10 when in the orientation illustrated in FIG. 3, when the container 10 is in the open position.

It should be understood that container 10 may take on any size and shape but most preferably comprises a booklet. The container 10 may be referred to herein as a booklet for the sake of convenience only; the term is not intended to be limiting.

As explained in more detail below, container 10 is designed to house a circular disc 12 (FIGS. 2–4) in an aesthetically appealing manner. Any suitable circular disc may be housed by the container 10, such as a conventional audio compact disc (CD) or CD-ROM, containing, for example, musical compositions, software, audio or visual information, or combinations thereof. The circular disc 12 may be referred to herein as a compact disc for the sake of convenience only; the term is not intended to be limiting.

Figure 2:
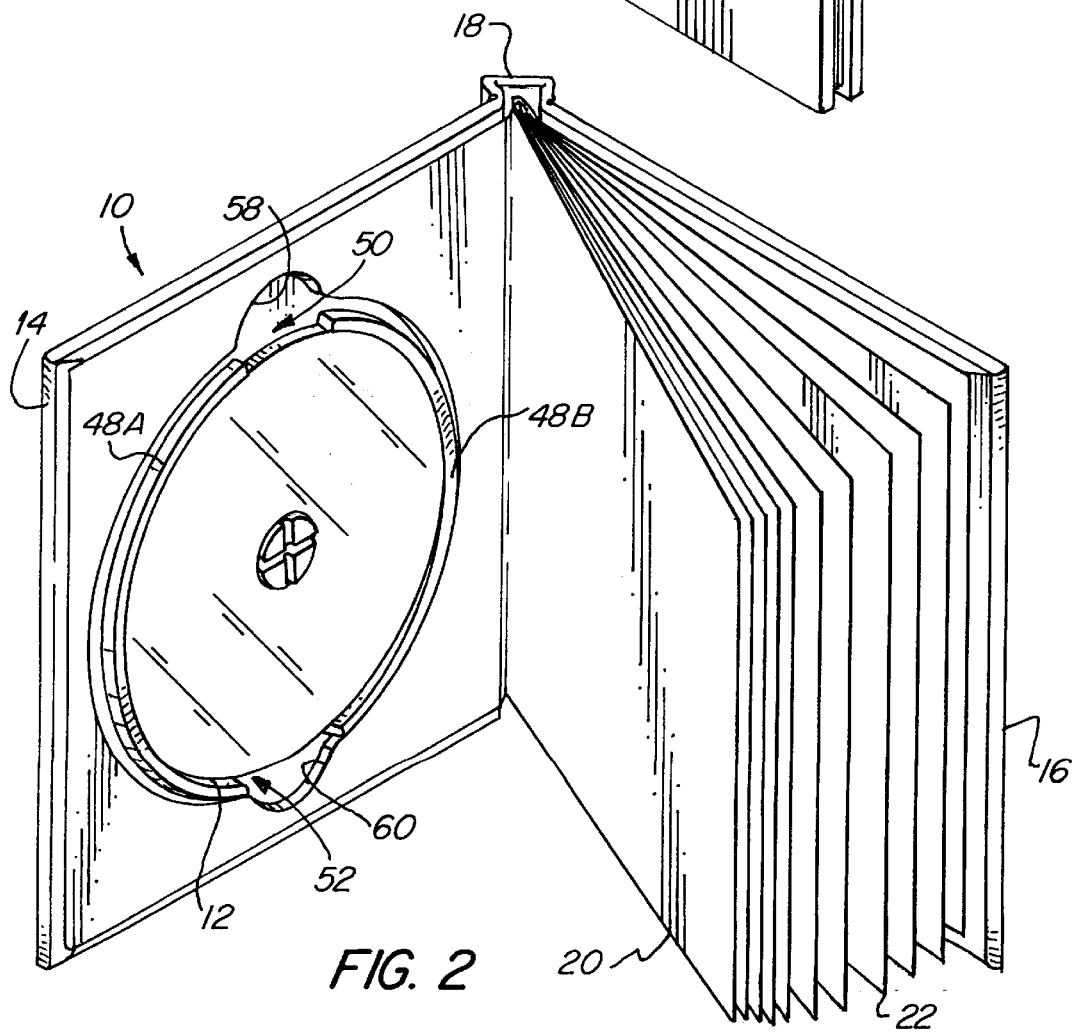
FIG. 2 is an isometric view of the booklet of FIG. 1 in the open position and showing the booklet's central hub.

Referring to FIGS. 1, 2 in more detail, container or booklet 10 comprises front and back covers 14, 16, respectively. Covers 14, 16 may be made in any conventional manner and of any suitable material, such as relatively heavy-weight cardboard, which has sufficient structural integrity to serve its intended purpose. Covers 14, 16 are movable about a spine or hinge 18 (FIG. 1) in a manner known in the art between a closed position (FIG. 1) and an open position (FIG. 2).

Figure 3:
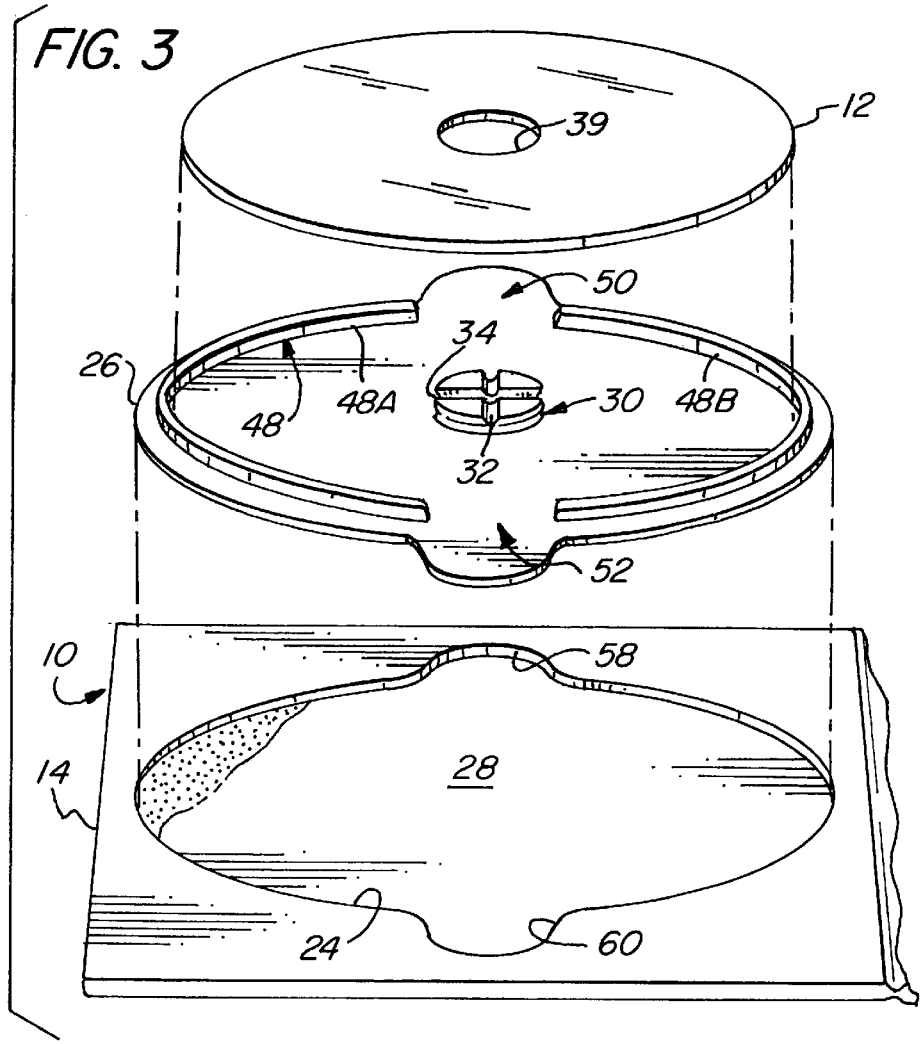
FIG. 3 is an exploded view of the compact disc holder booklet shown in FIG. 2.
Figure 4:
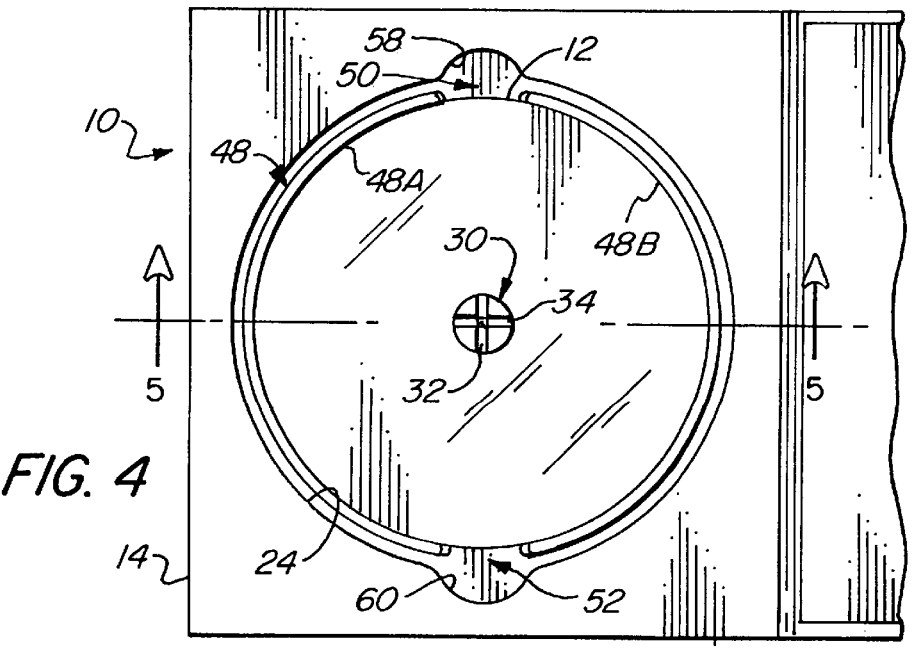
FIG. 4 is a top view of the compact disc holder booklet shown in FIG. 2, parts of the booklet having been broken away for the sake of convenience only.

As best shown in FIGS. 2–4, compact disc 12 is preferably housed on the inside of front cover 14 allowing the compact disc 12 to be viewed by the user (not shown) when the booklet 10 is in the open position and sufficiently protected from damage when the booklet 10 is in the closed position (FIG. 1). Advantageously, when booklet 10 is in the open position (FIGS. 2–4), CD 12 is displayed in full view to the consumer in a very decorative manner, which may enhance its appeal to the consumer and encourage impulse buying. When booklet 10 is in the closed position, compact disc 12 is stored such that the readable surface of CD 12 is protected from harm and may be mailed to purchasers with relatively little risk of damage to the CD.

Booklet 10 further comprises at least one and preferably a plurality of pages 20, 22 of textual information, such as a "user's guide" or background information about a particular recording artist, which complements, explains or otherwise relates to the information on the circular disc 12. A page of textual information 20, for example, may provide information regarding, inter alia, the composers, the compositions, people, places and events linked to compositions on the CD 12, as well as general information regarding how certain works came to be written.

Referring to FIGS. 2–4 in detail, at least one cover, such as 14, has a recessed portion 24 therein. In the most preferred embodiment, the recessed portion 24 is on the inside of front cover 14. It should be understood, however, that recessed portion 24 could be positioned in any suitable location, such as on the inside of back cover 16.

Compact disc holder tray 26 is secured in recess portion 24 of the booklet cover 14 for removably housing the compact disc 12 in the booklet cover 16 in a decorative fashion that allows the compact disc 12 to be viewed by the consumer when booklet 10 is in the open position. See FIGS. 2–4. Compact disc holder tray 26 may be made of any suitable material and in any suitable manner. Most preferably, compact disc holder tray 26 is formed from a single, relatively thin piece of any suitable plastic resin material such as polyethylene, polypropylene, high impact polystyrene, impact modified acrylic or the like via injection molding or other suitable process known in the art. It should be understood by those skilled in the art that the tray and its integral hub may be manufactured from other suitable materials that exhibit the desired properties of supporting and engaging the disc, as discussed more fully herein.

Compact disc holder tray 26 is dimensioned to closely approximate the diameter of a conventional compact disc 12. Tray 26 comprises a bottom surface 28 (FIG. 3) that lies in a plane. A hub 30 is integrally formed on the bottom surface 28 of tray 26 and is dimensioned to releasably hold compact disc 12 within booklet 10.

As best shown in FIGS. 3, 5–7, hub 30 comprises at least one and preferably a plurality of grooves 32, 34 that extend at least partially across a top portion 36 (FIG. 6) of hub 30 forming four wedge-shaped members 38, 40, 42, 44. Each groove has a depth such that the bottom 38, for example, of each groove 32, 34 resides in a plane that is higher than the plane containing the bottom surface 28 (FIG. 3) of the tray. It should be understood that as many grooves 32, 34 as desired could be cut into the top portion 36 of hub 30. Grooves 32, 34 allow hub 30 to flex enough to receive and hold the compact disc 12 yet provides a simple construction that is economical to manufacture and durable.

Hub 30 is dimensioned to mate with and releasably engage the central hole 39 (FIG. 3) of disc 12. In the preferred embodiment, hub 30 has a top and a bottom. The top of hub 30 has a diameter that is less than the diameter of the bottom of the hub. Thus, as the user gently forces compact disc 12 into tray 26, the central aperture 39 of CD 12 becomes frictionally engaged with the hub 30 and sufficiently releasably holds the compact disc 12 in the booklet 10. When CD 12 is properly positioned in tray 26, a gap 61 forms between the bottom surface 28 of tray 26 and CD 12. Gap 61 serves to protect the information bearing layer of CD 12 from damage due to excessive contact with bottom surface 28 of tray 26.

Advantageously, because grooves 32, 34 do not extend to or through the bottom surface 28 of tray 26, the tray 26 and the hub 30 may be formed from a single piece of plastic. Therefore, the tray itself requires no assembly. The only assembly required includes positioning the tray 26 into the recessed portion 24 on the inside front cover 14 of booklet 10. As such, the booklet 10 of the present invention is very inexpensive to manufacture, relatively easy to assemble, yet extremely durable and visually appealing to consumers.

Referring to FIGS. 5–7, compact disc holder tray 20 further comprises a lip 48, having two members 48A, 48B, formed integrally with tray 26 and positioned about the perimeter of tray 26. Lip 48 rises from the bottom surface 28 of tray 26 to approximately the same height as or slightly higher than the top 36 (FIG. 6) of hub 24. Lip 48 has a height greater than the height of the compact disc 12 when the compact disc 12 is positioned in tray 26. Thus, lip 48 acts as a stop member and assists in protecting compact disc 12 when housed in booklet 10, because it limits how closely the facing page (or cover) of booklet 10 may come to compact disc 12. Lip 48 may have any size or shape so long as it performs its intended function but most preferably lip 48 has a diameter that closely approximates the diameter of compact disc 12, as best shown in FIG. 3.

Referring to FIGS. 2–4, lip 48 has at least one and preferably two cutout portions 50, 52, between members 48A, 48B, sized and shaped to allow a user to insert a digit (not shown) under the compact disc 12 so as to remove the compact disc 12 from the booklet 10, when the compact disc 12 is releasably held in tray 26. It should be understood that as many cutouts 50, 52 as desired could be made in lip 48, so long as the structural integrity of lip 48 was maintained. Additional cutouts 54, 56 are made from the inside of front cover 14 to facilitate removal of CD 12 from booklet 10.

In operation, a user moves booklet 12 from the closed position (FIG. 1) to the open position (FIG. 2). Then, the user grasps a CD 12 and places the bottom of the CD such that it is facing the bottom surface 28 of tray 26. The user then positions the central aperture 39 about hub 30 and gently forces CD 12 onto hub 30 and into tray 26. When CD 12 is properly positioned in tray 26, a gap 61 (FIG. 5) is formed between the bottom of CD 12 and the bottom of tray 26 to protect the CD and the information contained therein from being damaged.

To remove the CD 12, the user inserts a digit through either of the slots 50, 52 of the lip 48 and gently lifts the CD 12 upward, applying, if necessary, counter-force to hub 30.

It should be understood that the booklet 10 has been shown housing only one CD for convenience only. More CDs could be housed in booklet 10, if so desired. For example, another CD could be housed in the inside of the back cover 18 of the booklet 10. The means and method for housing more than one CD should be apparent to those skilled in the art after reading this disclosure.

It should be understood that the foregoing is illustrative and not limiting and that obvious modifications may be made by those skilled in the art without departing from the spirit of the invention. Accordingly, reference should be made primarily to the accompanying claims, rather than the foregoing specification, to determine the scope of the invention.

What is claimed is:

1. A container for housing a circular disc, the circular disc containing information, the container movable between an open and closed position, the container comprising:

at least one cover having a recessed portion therein;

a tray positioned in the recessed portion of the cover for removably housing the circular disc in a fashion that allows the circular disc to be viewed when the container is in the open position, the tray comprising:

a bottom surface that lies in a plane;

a hub integrally formed on the bottom surface of the tray and dimensioned to releasably hold the circular disc within the container, the hub comprising at least one groove extending at least partially across a top portion of the hub and having a depth such that the bottom of each such groove resides in a plane that is higher than the plane containing the bottom surface of the tray; and at least one page, adjacent to the cover and inside the container, for providing information to a user that complements the information contained on the circular disc.

2. The container of claim 1, the hub having a top and a bottom, wherein the top of the hub has a diameter that is less than the diameter of the bottom of the hub so as to releasably hold the circular disc when the circular disc is positioned in the tray.

3. The container of claim 2, the tray having a lip positioned about the perimeter of the tray, the lip having a height greater the height of the circular disc when the circular disc is releasably held in the tray.

4. The container of claim 3, the lip having a cutout portion sized and shaped to allow a user to insert a digit under the circular disc so as to remove the circular disc from the tray, when the circular disc is releasably held in the tray.

5. The container of claim 1, wherein the tray is formed from a single piece of plastic.

6. The container of claim 5, wherein the tray is formed by injection molding.

7. The container of claim 1, wherein the container contains a plurality of pages attached inside the container for providing information to a user which complements the information contained on the circular disc.

8. The container of claim 1, wherein the circular disc is a compact disc.

9. A booklet for housing a compact disc, the compact disc containing information, the booklet movable between an open and closed position, the booklet comprising:

at least one cover having a recessed portion therein;

a compact disc holder tray positioned in the recessed portion of the cover for removably housing the compact disc in a fashion that allows the compact disc to be viewed when the booklet is in the open position, the compact disc holder tray comprising:

a bottom surface that lies in a plane;

a hub positioned on the bottom surface of the compact disc holder tray comprising at least one groove extending at least partially across a top portion of the hub and having a depth such that the bottom of each such groove resides in a plane positioned higher than the plane containing the bottom surface of the compact disc holder tray, the top of the hub having a diameter that is less than the diameter of the bottom of the hub so as to releasably hold the compact disc in the booklet when the compact disc is positioned in the compact disc holder tray;

a lip positioned about the perimeter of the compact disc holder tray, the lip having a height greater the height of the compact disc when the compact disc is releasably held in the booklet; and a plurality of pages, adjacent to the cover and attached inside the booklet, for providing information to a user that complements the information contained on the compact disc.

10. The booklet of claim 9, the lip having a cutout portion sized and shaped to allow a user to insert a digit under the compact disc so as to remove the compact disc from the compact disc holder tray, when the compact disc is releasably held in the booklet.

11. The booklet of claim 10, wherein the compact disc holder tray is formed from a single piece of plastic.

12. The booklet of claim 11, wherein the compact disc holder tray is formed by injection molding.

13. A booklet for housing a compact disc, the compact disc containing information, the booklet movable between an open and closed position, the booklet comprising:

at least one cover having a recessed portion therein;

a tray positioned in the recessed portion of the cover for removably housing the compact disc in a fashion that allows the compact disc to be viewed when the booklet is in the open position, the tray comprising:
 a bottom surface that lies in a plane;
 a hub positioned on the bottom surface of the tray comprising at least one groove extending at least partially across a top portion of the hub and having a depth such that the bottom of each such groove resides in a plane positioned higher than the plane containing the bottom surface of the tray, the top of the hub having a diameter that is less than the diameter of the bottom of the hub so as to releasably hold the compact disc in the booklet when the compact disc is positioned in the tray;

a lip positioned about the perimeter of the tray, the lip having a height greater the height of the compact disc when the compact disc is releasably held in the booklet, the lip having a cutout portion sized and shaped to allow a user to insert a digit under the compact disc so as to remove the compact disc from the compact disc holder tray, when the compact disc is releasably held in the booklet; and a plurality of pages, adjacent to the cover and attached inside the booklet, for providing information to a user that complements the information contained on the compact disc.

14. The booklet of claim 13, wherein the tray is formed from a single piece of plastic.

15. The booklet of claim 14, wherein the tray is formed by injection molding.

* * * * *